United States Patent
Ehrlich et al.

(10) Patent No.: US 6,442,269 B1
(45) Date of Patent: Aug. 27, 2002

(54) METHOD AND APPARATUS FOR INTEGRATING BUSINESS DATA AND TRANSACTION DATA IN A TRANSACTION PROCESSING ENVIRONMENT

(75) Inventors: Jason Ehrlich, Pleasanton; Robert Joyce, San Jose; Steven Y. Yu, Fremont, all of CA (US)

(73) Assignee: Aspect Communications, San Jose, CA (US)

( * ) Notice: Subject to any disclaimer, the term of this patent is extended or adjusted under 35 U.S.C. 154(b) by 0 days.

(21) Appl. No.: 09/379,386

(22) Filed: Aug. 23, 1999

(51) Int. Cl.[7] .................. H04M 3/523; H04M 15/00

(52) U.S. Cl. ............. 379/265.03; 379/116; 379/119; 379/135; 379/266.1

(58) Field of Search ................ 379/113, 114, 379/115, 116, 119, 127, 133, 134, 135, 136, 265, 266, 309, 112.01, 114.01, 115.01, 127.03, 265.01, 265.02, 265.03, 266.01, 266.1

(56) References Cited

U.S. PATENT DOCUMENTS 5,511,117 A * 4/1996 Zazzera ................. 379/265
5,546,455 A   8/1996 Joyce et al. ........... 379/265

* cited by examiner

Primary Examiner—Harry S. Hong
(74) Attorney, Agent, or Firm—Blakely, Sokoloff, Taylor & Zafman LLP (57) ABSTRACT

A method and apparatus for integrating business data and transaction data in a transaction processing environment comprises a telephone call processing system including a call distribution device connected to several agent devices through one type of communication link. The call distribution device is connected to an information server through another type of communication link. The information server includes a database for storing business data associated with call data for a particular call. A machine implemented method for storing data related to a call comprising the steps of transmitting a host data value from an agent device to the information server during a transaction, and, if a host data signal is received by the data warehouse during the transaction, associating the host data value with a transaction identifier and storing the host data value in the database a predetermined time after a termination of the call.

30 Claims, 9 Drawing Sheets

METHOD AND APPARATUS FOR INTEGRATING BUSINESS DATA AND TRANSACTION DATA IN A TRANSACTION PROCESSING ENVIRONMENT

FIELD OF THE INVENTION

The present invention relates generally to the processing, storing and accessing of information within an information processing system. More particularly, the present invention relates to tracking and storing information about individual transactions for report generation.

BACKGROUND OF THE INVENTION

Modern enterprises require the ability to collect detailed information about day to day activity such as changes in inventory, transactions with customers, and number, length and origination location of telephone calls. Any information that would aid in operation of the enterprise or future planning for the enterprise may be collected. Typically, an enterprise such as a mail order retail business or a stock brokerage uses an information processing system that collects specified information, stores it in a database, and allows a user to selectively access and arrange ("slice and dice") and retrieve the data.

One example of a commonly used information processing system is a system that processes transactions between the enterprise and those outside the enterprise. For example, various systems exist for receiving, routing, tracking and recording information about telephone calls to and from the enterprise. Particularly in the case of enterprises that do a significant amount of business by telephone with clients or customers, it is extremely useful to collect accurate information about customer telephone calls that can be easily and completely accessed and arranged into various report formats. As an example, a stock brokerage that takes orders by telephone would like to collect information about who a customer is, how much money the customer spends per time period, how long an average telephone call takes, how long a customer must wait to speak to an agent, how long an average telephone call lasts, what revenue an agent generates per time period, how many telephone calls an agent handles per time period, and so on.

Existing call processing systems typically receive calls coming into the enterprise and route them to various locations. An attempt is made to collect data about the calls, but data collection and storage capabilities of existing call processing systems have serious limitations. One limitation is the inability of the call processing system to store "call data" and "business data" related to a single call in one location where it can be easily accessed. This is because conventional call processing systems have limited ability to communicate with a computer terminal operated by a human agent taking a customer call. Typically, when a call is received by the system, the system routes the call to a human agent at a computer terminal, sometimes using information entered by the caller. The routed call is sent to the human agent and, simultaneously, the computer operated by the agent receives data from the system causing the computer to display relevant information to the agent, such as caller identity, caller buying history, etc. The agent conducts a business transaction with the caller, and at the end of the transaction, the agent is typically prompted by the computer to enter some "business data" about the transaction. The business data may include, for example, success, failure, revenue generated, stocks sold, etc. The business data is typically entered by the agent as a code or codes in predesignated fields of a record. The business data entered by the agent is typically written to a "local" database, for example, a storage device on the computer that the agent operates. "Call data", which includes information such as the duration of the call, the origin of the call, etc., is typically stored by the call processing system at the termination of the call connection. The call data is usually stored by the call processing system in a database that is local to the call processing system but remote from the agent's computer. The call processing system typically stores information about calls to many different agents in different locations.

In such prior call processing systems it is difficult or impossible to later extract coherent information about the entire customer call that includes both the business data and the call data. One of the reasons for this is current limitations in the communication link between the call processing system and the agent's computer. One prior call processing system uses a computer telephony integration (CTI) link to transmit American Standard Code for Information Interchange (ASCII) messages between the call processing system and an agent computer. Typically, control messages handling the call are sent from the call processing system to the agent computer during the call. These messages may include messages to indicate call connection and termination, or messages that cause a screen pop application to bring up relevant information on the agent's computer screen when the call is connected. The CTI link may also be used to transmit data from the agent computer to the call processing system during the call. This data may include business data related to the call that is entered by the agent during the call. Usually limited fields exist for the entry of business data by the agent. This limits the amount and types of business information that may be collected for a call. Another limitation of typical systems is that the CTI link is only open when the call is actually connected and is closed upon termination of the call. Therefore, the call may be disconnected before an agent has time to enter information about the call and transmit the information to the call processing system.

Conventional call processing systems thus have the disadvantage of allowing limited business data to be entered only in a narrow time window. Conventional call processing systems are also subject to error on the part of the agent in entering business data.

Existing call processing systems have additional disadvantages related to the way in which call data is collected and stored by the system for later analysis. A "call" is typically defined in a limited way that prevents complete records about a call from being collected. For example, in the case of a call that is transferred at least once after being initially received by the system, the call is typically defined as occurring between connection and disconnection, or hang up. This definition is not very accurate or useful, because the call may have included several segments during which different resources were connected, and involved several different agents and several different periods during which a calling customer was required to "hold". It would be extremely useful to be able to identify each segment of a call and what happened during each segment in order to in order to better analyze customer needs and agent performance.

Conventional systems lack the capability of identifying every segment of a call as being part of a single call. One prior attempt to identify call segments uses a tracking number in a field of a call record. This method identifies some segments of a call, but not all possible segments of a call. As an example, when a call from a customer is connected to a first agent, a tracking number is assigned to the record created by that connection. If, however, the first agent, during the same call, calls a second agent and then connects the customer to the second agent, the segment between the customer and the second agent receives the same tracking number as the segment between the customer and the first agent, but the segment between the first agent and the second agent receives a different tracking number. Call information collected by this method may be later retrieved and analyzed to produce an inaccurate report. For example, the call duration from the customer's point of view is recorded as the time actually spent connected to the agents, while the call duration actually experienced by the customer includes the time the customer waited to be connected to the second agent. The difficulty in collecting accurate data on all segments of a call is exacerbated in the common case of a call that is handled by multiple call processing systems of a large networked system, where each call processing system may do independent data marking and storage.

In addition to these data collection limitations, conventional call processing systems typically do not store business data and call data together so that it may be easily accessed and associated with the proper call. Most business data is not transmitted from the agent computer to the call processing system, but is stored locally with respect to the agent computer, for example, in a storage device of the agent computer. Although prior systems have limited capability to store some business data and some call data while preserving the relationship of the data to the call, retrieval is usually cumbersome. For example, it is possible to provide for an indirect linkage of stored business data and stored call data for the same call by placing matching information in a predesignated field of a record in the system database (for the call data) and a predesignated field of a record in the database external to the system (for the business data). Retrieval of the data for the single call, however, requires lookups in two databases. Yet another disadvantage of conventional transaction processing systems is that collected transaction data is usually assembled in a retrievable format only periodically so that near-real-time data is not available. For example, a conventional system may allow for database queries regarding transactions that occurred no more recently than one day prior to the query.

SUMMARY OF THE INVENTION

A method and apparatus for integrating business data and transaction data in a transaction processing environment are described. One embodiment comprises a telephone call processing system including a call distribution device connected to several agent devices through one type of communication link. The call distribution device is connected to an information server through another type of communication link. The information server includes a database for storing business data associated with call data for a particular call. One embodiment includes a machine implemented method for storing data related to a call comprising transmitting a host data value from an agent device to the information server during a transaction, and, if a host data signal is received by the data warehouse during the transaction, associating the host data value with a transaction identifier and storing the host data value in the database a predetermined time after a termination of the call.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for integrating business data and transaction data in a transaction processing system are described. In the following description, for the purpose of explanation, numerous specific details are set forth in order to provide a thorough understanding of the present invention. It will be evident, however, to one skilled in the art that the present invention may be practiced without these specific details.

Figure 1:
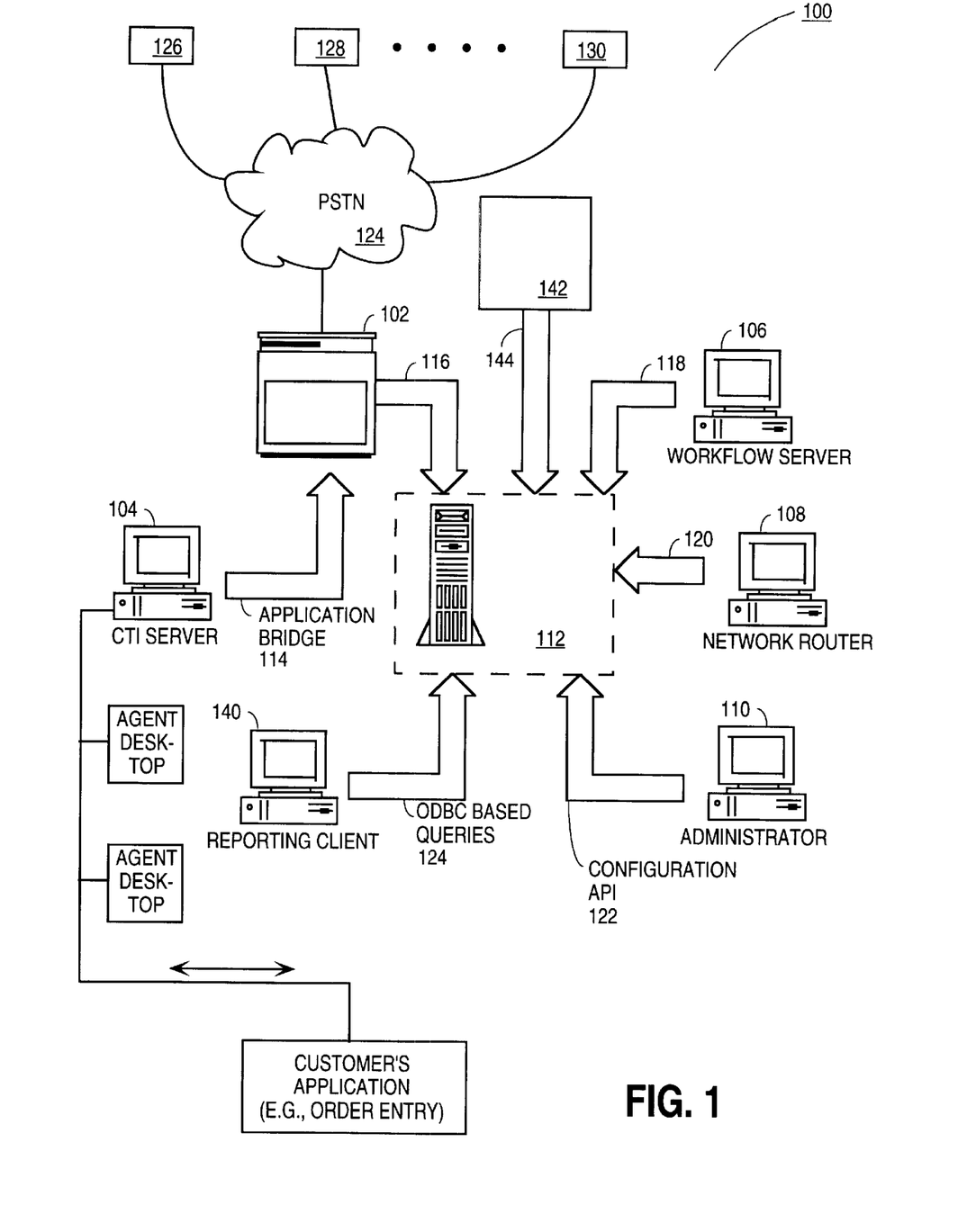
FIG. 1 is a block diagram of one embodiment of an information processing environment.

FIG. 1 is a block diagram of an embodiment of a telephone call processing system 100. Call processing system 100 includes information server 112, which includes hardware and software for collecting and storing information regarding call transactions in system 100. Information server 112 collects, processes, consolidates and provides access to near-real-time and historical transaction data generated by, and pertaining to, multiple transaction processing systems. As described in more detail with reference to FIG. 2, information server 112 is of the type sometimes referred to as a data mart or data warehouse. Information server 112 stores multiple gigabytes of data in a database that constitutes information (e.g., both data and metadata) regarding resource configurations, transactions and other environment parameters, conditions and functions (e.g., call, agent and trunk events, fact records and summaries). In one embodiment, the database uses a data model that is an open star schema data model suitable for querying and reporting. This data model is especially suitable for online analytical processing (OLAP) and provides many benefits compared to prior relational databases. For example, the star schema facilitates ad-hoc queries and report writing. Another benefit is that the model is extensible and allows tracking of resource configuration changes, such as a new agent using an old agent's extension. Another benefit is the ability to fully link related database records. A star schema data model is generally described by Ralph Kimball in The Data Warehouse Toolkit (John Wiley & Sons, Inc., 1996).

System 100 includes call distribution system 102, which receives and processes calls from outside system 100. Call distribution system 102 may be the Aspect® automatic call distributor (ACD) system manufactured by Aspect Telecommunications Corp. of San Jose, Calif. Processing includes routing calls and logging and storing information regarding calls. Call distribution system 102 is connected to information server 112 by data link 116. Data link 116 is a point-to-point communications link. In one embodiment, data link 116 is a transmission control protocol/internet protocol (TCP/IP) link for transmitting near-real-time data between call processing system 102 and information server 112 in, for example, a C programmatic format. Call distribution system 102 is connected to multiple telephone units 126, 128, and 130 through public switched telephone network (PSTN) 124. Call distribution system 102 receives and processes incoming calls through PSTN 124. In other embodiments, call distribution system 102 is coupled to other devices (not shown) that initiate calls into system 100. For example, call distribution system 102 may be connected to a device that initiates calls to call distribution system 102 through a different network than PSTN 124.

Call distribution system 102 is connected to computer telephony interface (CTI) server 104 through application bridge 114. In one embodiment, application bridge 114 transmits American Standard Code for Information Interchange (ASCII) messages between CTI server 104 and call distribution system 102. In one embodiment, CTI server 104 is coupled to multiple agent devices, or agent computers 103 used by a human agent who participates in call transactions. The human agent may transmit messages regarding a current call transaction at any time during the call and also for a predetermined time after the call is disconnected. In one embodiment, call transaction information may be sent over the application bridge 114 for up to 30 seconds after a call is disconnected. In other embodiments, the time may be more than 30 seconds or less than 30 seconds.

Information server 112 is connected to reporting client 140 through link 124. Reporting client 140 may be any open database connectivity (ODBC) compliant application, and makes queries against the database of information server 112, and formats the results of these queries based on a predefined set of instructions (i.e., a report definition). The reporting client 140 may further include a method of scheduling reports to run at predetermined times.

Information server 112 is connected to administrator 110 through link 122. Administrator 110, in one embodiment, is an application that allows a user to view, configure, and control the operation of information server 112 through programming interfaces (APIs). Administrator 110 may be a Microsoft Foundation Class (MFC) 4.0 application, and could accordingly reside on a Windows 95, Windows NT workstation or Windows NT Server platform. Administrator 110 facilitates configuration and management of information server 112. For example, utilizing a graphical user interface (GUI) provided by the administrator 110, a user may define data sources, set data destinations, specify rules, formulas and frequencies for data summaries, view server system metadata information, events, and task statuses. Administrator 110 communicates with server components of information server 112 through an API that makes use of Remote Procedure Call (RPC) to facilitate remote management of information server 112.

Network router 108 is connected to information server 112 through data link 120. Data link 120 is of the same type as data link 116 and allows communication using ASCII messages in some predetermined format. Workflow server 106 is connected to information server 112 through data link 118, which is of the same type as data link 116. Data links 116, 118 and 120 allow transmission of a recoverable near-real-time data stream. In contrast to conventional data marts which periodically poll a data source and store the poll results in a database, system 100 collects, arranges and stores data in near-real-time so that a user may query the database is required to extract, for example, data for the preceding hour.

In some embodiments, system 100 includes multiple call distribution centers 102. In these embodiments, data from each call distribution system 102 is collected and managed by information server 112.

Figure 2:
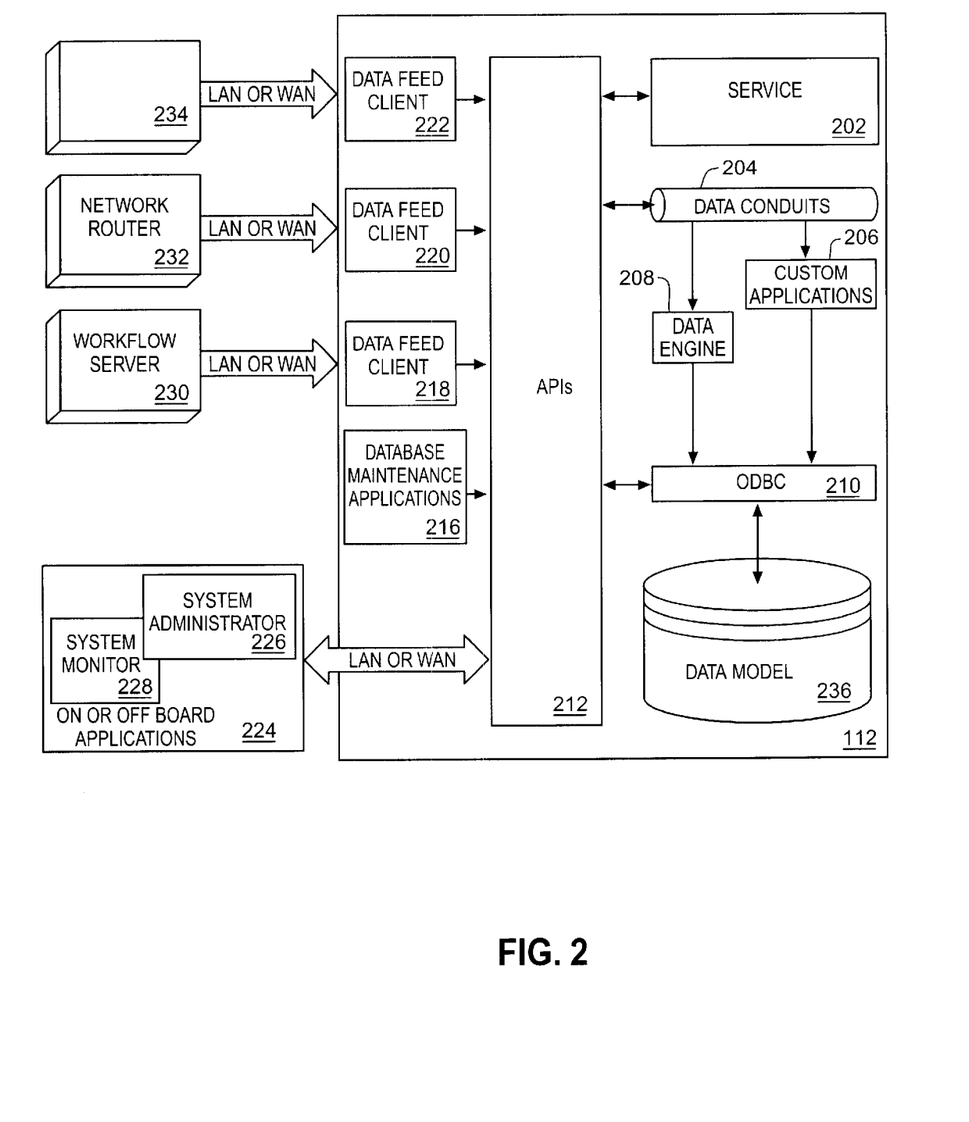
FIG. 2 is a block diagram of one embodiment of an information server.

FIG. 2 is a block diagram of one embodiment of information server 112. Information server 112 includes data model 236, which in one embodiment, is a star schema on an Oracle database. Data engine 208 and custom applications 206 access data model 236 through ODBCs 210. Data engine 208 and custom application 206 transmit information from APIs 212 through data conduits 204. For example, data engine 208 is an information server 112 application that gathers, stores, and summarizes records received via data conduits 204. APIs 212 allow remote applications to monitor and control information server 112 and its data.

Call distribution center 234 is connected to information server 112 through a local area network (LAN) or a wide area network (WAN) and a data feed client 222. Network router 232 is connected to information server 112 through a LAN or WAN and a data feed client 220. Workflow server 230 is connected to information server 112 through a LAN or WAN and a data feed client 218.

Database maintenance applications 216 communicate with data model 236 through APIs 212. On or off board applications 224 communicate with information server 112 through a LAN or WAN and APIs 212. On or off board applications 224 include system administrator 226 and system monitor 228, which allow users to view, configure, and control the operation of information server 112. System administrator 226 and system monitor 228, in one embodiment, run on information server 112. In other embodiments, system administrator 226 and system monitor 228 run on a remote administration workstation.

Service applications 202 controls data feeds, distributes records to information server applications and manages access to information server metadata.

Figure 3:
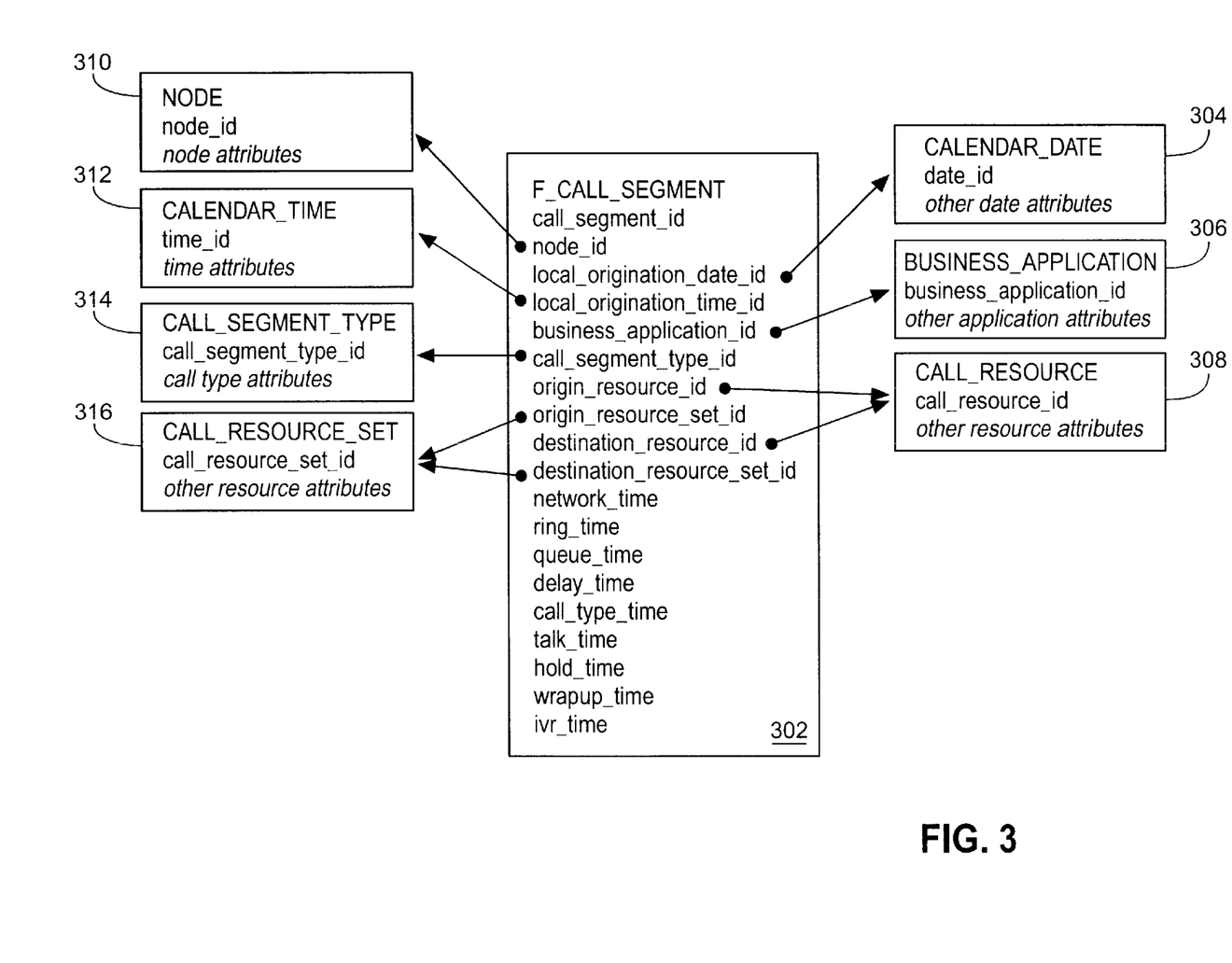
FIG. 3 is a block diagram of one embodiment of a call segment data model.

The data model of information server 112 implements star schemas for calls, agent and trunk events, other fact tables, and summaries. A star schema is a method of organizing data in which a central fact table contains scalar and other data, along with keys pointing to dimension tables (often referred to as dimensions) which contain descriptions of the attributes of the dimension. FIG. 3 is a diagram of an information server call segment fact table 302. Call segment fact table 302 includes flags indicating special characteristics of the call, such as whether it was the first segment of the call, whether a customer was involved, etc. Call segment fact table 302 further includes keys pointing to various dimensions such as the resource dimension for a description of the agent who handled the call, the call type dimension for a description of how the call was handled, the resource dimension again for a description of the trunk that was used for the call, and so forth. Call segment fact table 302 includes keys pointing to various dimensions. For example, call segment fact table 302 includes keys to node dimension 310, calendar_time dimension 312, call_segment_type dimension 314, call_resource_set 316, calendar_date dimension 304, business_application dimension 306, and call_resource dimension 308.

Figure 4:
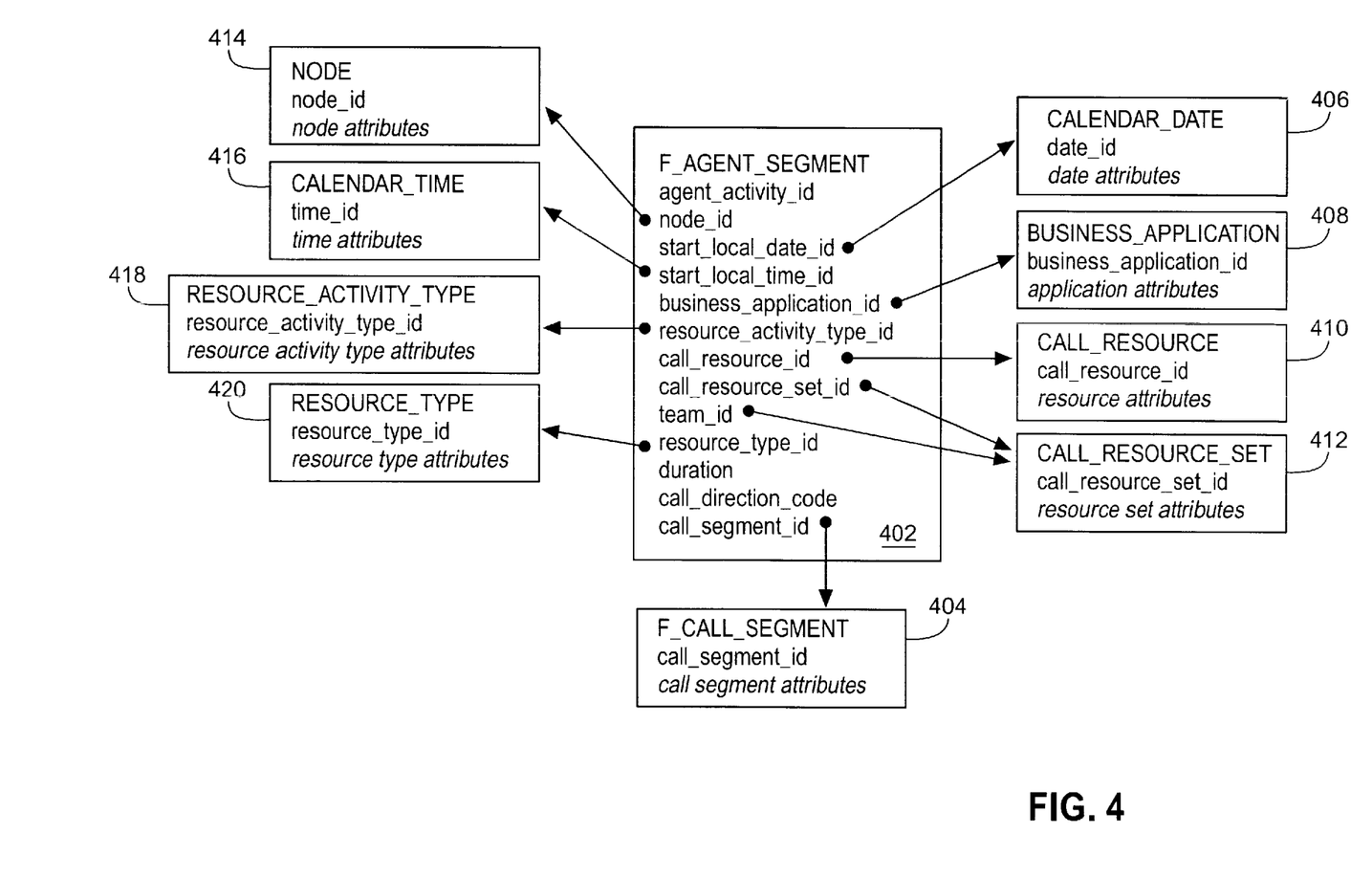
FIG. 4 is a block diagram of one embodiment of an agent activity fact table.

FIG. 4 is a diagram of agent activity fact table 402 and various associated dimension tables. Agent activity fact table 402 shows the type and duration of agent states, such as idle, talk, hold, and wrapup. In agent activity fact table 402, both call_resource_set_id and team_id point into the call resource set dimension 412, describing the agent's agent group and supervisor team respectively. A call_segment_id identifies the call segment, if any, associated with the agent activity. The agent activity fact table also includes keys pointing to node dimension 414, calendar_time dimension 416, resource_activity_type dimension 418, resource_type dimension 420, calendar_date dimension 406, business_application dimension 408, call_resource dimension 410, and call_resource_set dimension 412.

Figure 5:
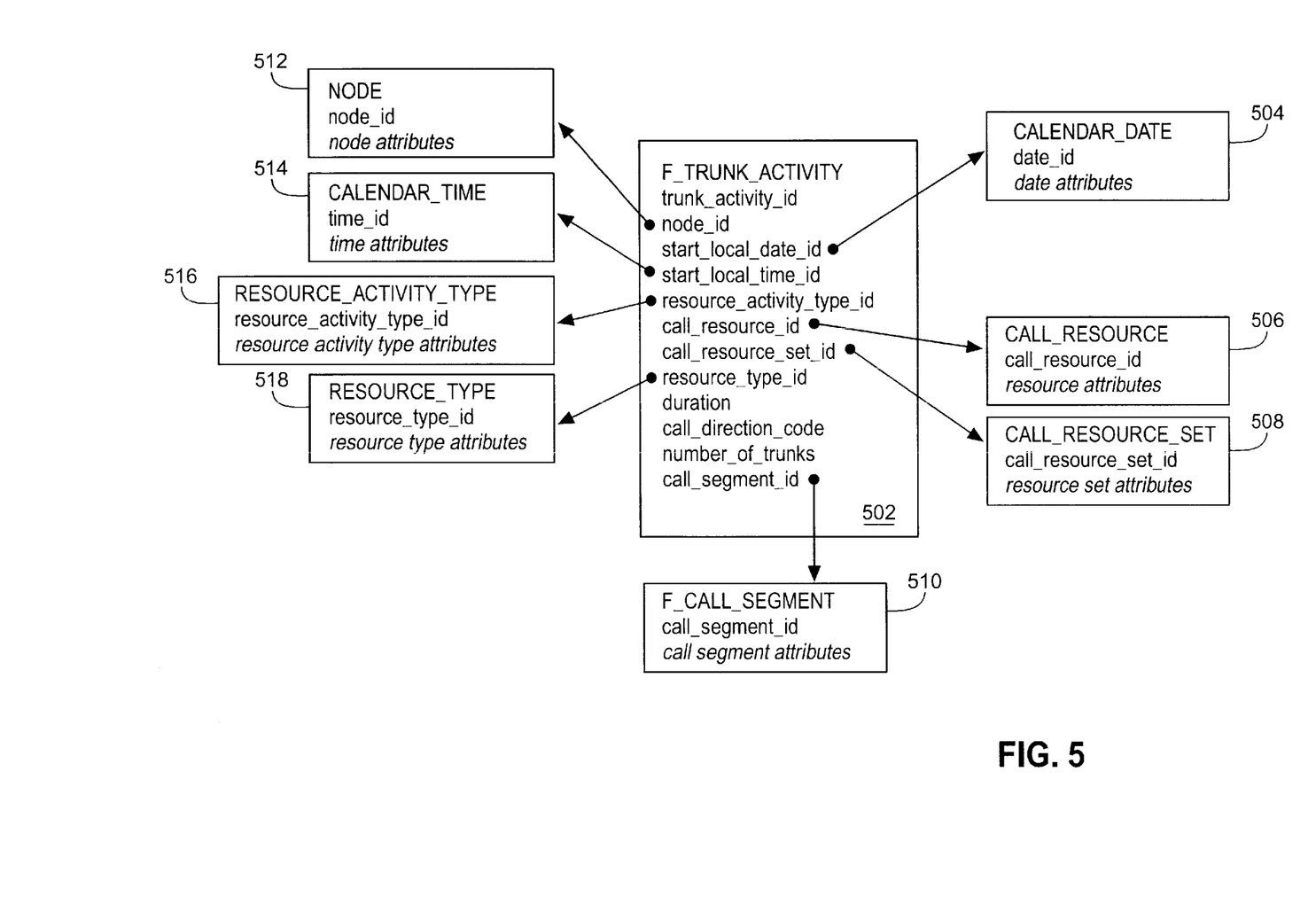
FIG. 5 is a block diagram of one embodiment of a trunk activity data model.

FIG. 5 is a diagram of trunk activity fact table 502 and associated dimension tables. In trunk activity fact table 502, records can describe events for a trunk, a voice trunk, or a trunk group. If the resource type is a trunk group and the activity type is an all trunks busy event, number_of_trunks contains the number of trunks in the trunk group. Like agent activity, trunk activity has a call_segment_id to identify the call, if any, associated with a trunk event.

Trunk activity fact table 502 includes keys to node dimension table 512, calendar_time dimension table 514, resource_activity_type dimension table 516, resource_type dimension table 518, calendar_date dimension table 504, call_resource dimension table 506, and call_resource_set dimension table 508.

Figure 6:
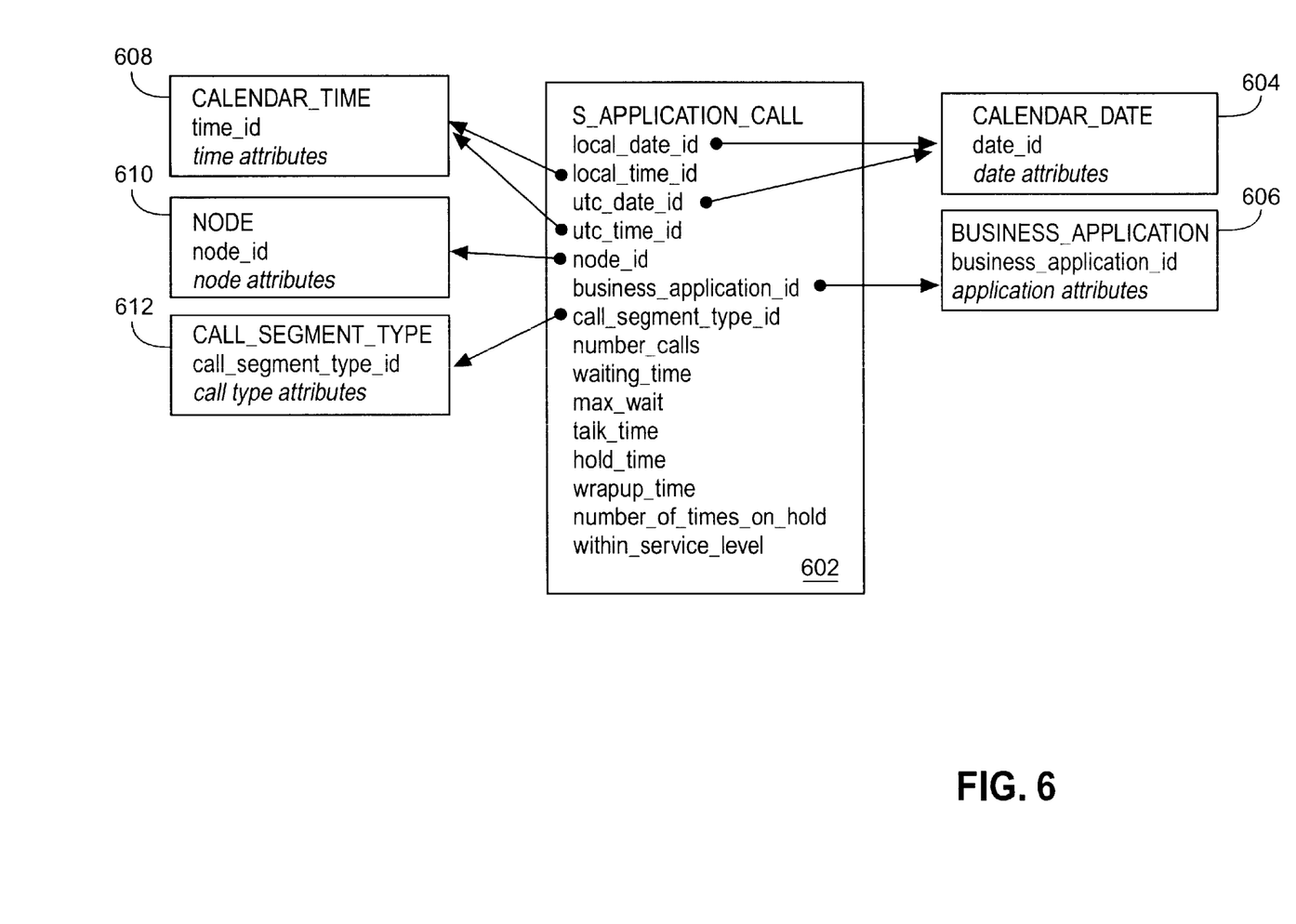
FIG. 6 is a block diagram of one embodiment of a call metrics summary data model.

FIG. 6 is a diagram of application call metrics summary fact table 602. Summary fact tables 602 summarize records from a fact table along one or more dimensions. For example, call records could be summarized along the time dimension and along the agent group dimension, creating one record summarizing all the calls processed by one agent group for a period of one hour. Summary tables use the same dimensions as ordinary fact records. Application call metrics summary fact table 602 includes keys to calendar_time dimension table 608, node dimension table 610, call_segment_type dimension table 612, calendar_date dimension table 604 and business_application dimension table 606.

Figure 7:
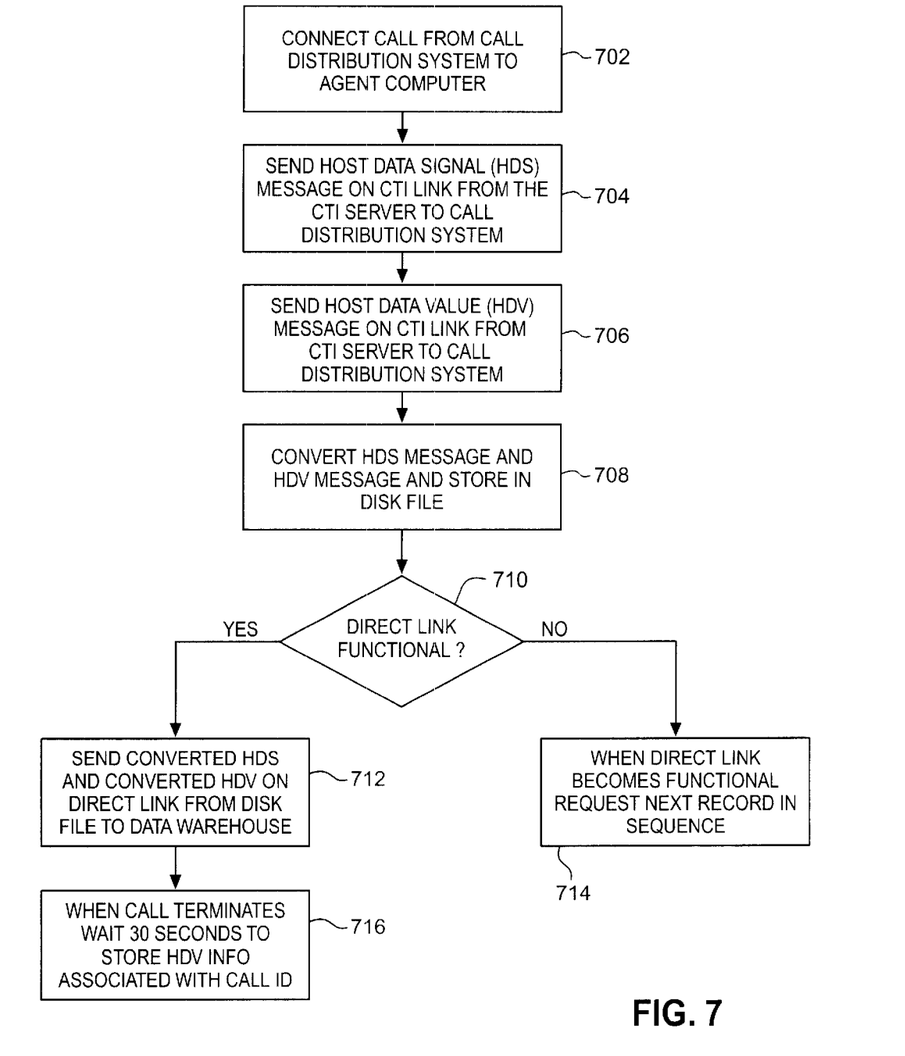
FIG. 7 is a flow diagram of one embodiment of a method for storing business data and call data.

In one embodiment, the present invention stores business data with call data in near-real-time in a fault tolerant manner. FIG. 7 is a flow diagram of one embodiment of call processing. Referring to FIG. 7, at 702, and FIG. 1, at 802, a call is connected from call distribution system 102 to an agent computer coupled to the CTI server 104. A host data signal (HDS) message is sent from the CTI server 104 via CTI link 114 to call distribution system 102 at 704. The host data signal message signals software on information server 112 to wait for a host data value message before writing all the information about a call to disk. This allows for the storage of business data in the call segment record. A time out value is specified on information server 112. The default is thirty seconds. This allows data associated with a call to be transmitted for up to thirty seconds after the call is disconnected. The call with which the host data is to be associated is specified by a callID field. The host data signal message has the format shown in Table 1 below.

TABLE 1

Host Data Signal (HDS) Message Format

| HEADER | TYPE | CALLID |
| --- | --- | --- |
| 12 bytes | 3 bytes | 4 bytes |

The HDS message format also include a length field (not shown in Table 1) that conforms to the standard definition in Ethernet applications and precedes the header field.

The header identifies the host machine name for an Ethernet connection or a RS-232 connection. The header field is a variable-length alphanumeric field. The type field may be used to identify a type of HDS message as required. CallID is a 4 byte numeric field that identifies the call origination number assigned to the call by call distribution system 102.

At 706, a host data value (HDV) message is sent on CTI link 114 from the CTI server 104 to call distribution system 102. The HDV message contains information from a host application which is to be stored with the call segment record written on information server 112. This message is of variable length and can be sent at any time during the call. However, information server 112 software will only wait for this message before it writes a call segment if a host data signal message had been sent previously for the call. One embodiment of a host data value message is shown below.

TABLE 2

Host Data Value (HDV) Message Format

| HEADER | TYPE | CALLID | NUMBER OF VARIABLES |
| --- | --- | --- | --- |
| 12 bytes | 3 bytes | 4 bytes | 2 bytes |

A length field (not shown) precedes the header field and must include the length of the entire message including all the host information variables being sent.

The header identifies the host machine name for an Ethernet connection or for a RS-232 connection. It is a variable-length alphanumeric field. The type field may be used to identify a type of HDV message as required.

CallID is a 4 byte numeric field identifies the call origination number assigned to the call by call processing. The number of variables field is a 2 byte field that indicates a number of host information variables to follow.

Variable identifier is a 2 byte numeric field that contains the variable identifier of this host information variable (for example, 1=Customer Id, 2=Business Transaction Id, 3=Revenue). Variable identifiers of one embodiment are shown in Table 3.

The variable length field is a 3 byte numeric field contains the length of the data field following.

The data field contains the data content of the host information variable being sent.

TABLE 3

Host Information Variable (Could be more than one of the following)

| VARIABLE IDENTIFIER | VARIABLE LENGTH | DATA |
| --- | --- | --- |
| 2 bytes | 3 bytes | length of this field is specified by the value in the variable length field |
| Variable | Description | |
| Customer Id | Identifies the customer performing this transaction. Can be any alpha numeric string of up to 40 characters maximum | |
| Business Transaction Id | Links call information with information in the host data system. Can be any alpha numeric string of up to 40 characters maximum | |
| Revenue | Represents the revenue associated with this transaction. Is a decimal number. Valid characters are 0–9 and the decimal point. 9.00 = nine dollars, 151.39 = one hundred dollars and 39 cents. The maximum size of this field is 14 characters. Commas are not used. It is | |

TABLE 3-continued

Host Information Variable (Could be more than one of the following)

acceptable not to provide a decimal point. No cents would be part of this revenue value.

At 708, the HDS message and the HDV message are encapsulated according to the TCP/IP format by call distribution system 102 and stored with a sequence number in a disk file on call distribution system 102. The TCP/IP format is the proper format for storage in information server 112. The TCP/IP format in which the HDS and HDV signal ASCII messages are encapsulated as partially described in Tables 4 and 5.

TABLE 4

Host Data Signal

| Message Class | Message Type | Length | Timestamp | CallId |
|---|---|---|---|---|
| 2 bytes | 2 bytes | 4 bytes | 4 bytes | 2 bytes |

TABLE 5

Host Data Value

| Message Class | Message Type | Length | Timestamp | CallId | Number Of Variables |
|---|---|---|---|---|---|
| 2 bytes | 2 bytes | 4 bytes | 4 bytes | 2 bytes | 1 byte |

Figure 8:
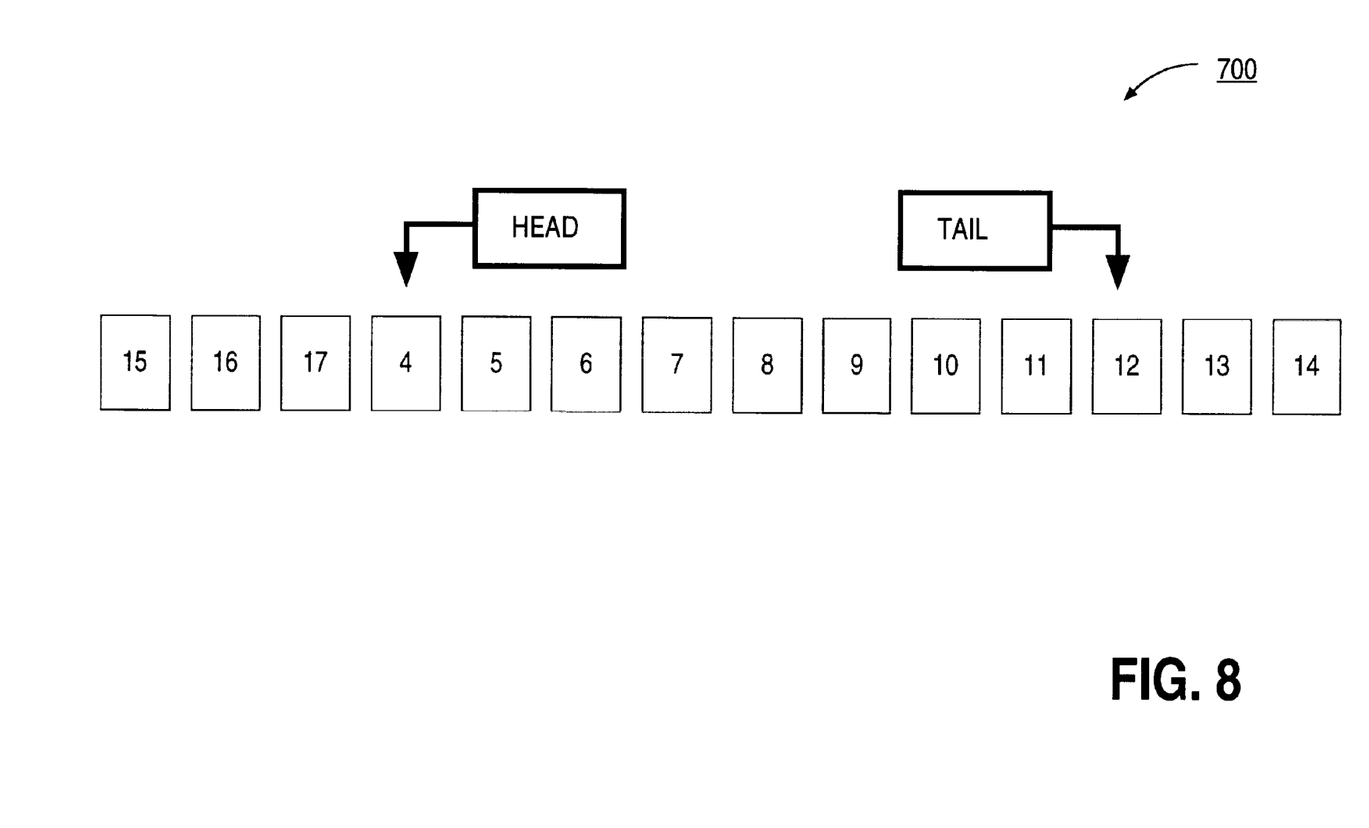
FIG. 8 is a block diagram of one embodiment of a persistent buffer.

In one embodiment, the disk file is a persistent circular buffer 700 as shown, for example, in FIG. 8. Persistent buffering of data prevents loss in the event of a network or transaction processing system failure such as a failure of data link 116, insufficient bandwidth, a controlled shutdown or a power failure. New messages are placed at the head of buffer 700, and messages are removed from the tail for transmission. When the head or tail of buffer 700 reaches the end of the memory set aside for buffer 700, it is reset to the beginning.

FIG. 8 shows a circular buffer 700 with fourteen buckets for data. Seventeen records have been added to buffer 700, and eleven have been removed. The next record inserted will be number 18, and will go into position 4. The next record read will be number 12. In one embodiment, the size of the recovery buffer is 95 MB, which is approximately sufficient to hold events and data corresponding to 100,000 single-segment calls. Other embodiments include a 300 MB buffer, which is approximately sufficient to hold events and data corresponding to more than 300,000 single-segment calls. An example of a single-segment call is an incoming call that is handled by an agent, with no transfers or new transaction steps.

If information server 112 reconnects to call distribution system 102 before buffer 700 has overflowed, the data feed will begin sending messages from the tail of buffer 700. This means that older data is sent first, while new data continues to be added at the head of buffer 700. If buffer 700 does not overflow during the downtime and subsequent recovery, no data will be lost. However, until the tail of buffer 700 catches up with the head, data will not be available in near-real-time.

If the head of buffer 700 passes the tail at any time, the head and tail of buffer 700 reset. Some data maybe lost, but this is necessary to ensure the integrity of the data that is preserved. The network bandwidth should be of sufficient capacity and reliability to ensure that buffer 700 will not overflow.

The amount of time buffer 700 can defend against data loss while a connection is down depends upon the size of buffer 700 and the rate at which information is being placed in buffer 700. The amount of time it takes to return to near-real-time operation depends upon the amount of data generated during downtime, and difference between the amount of bandwidth available and the rate at which new data is being generated.

Figure 9:
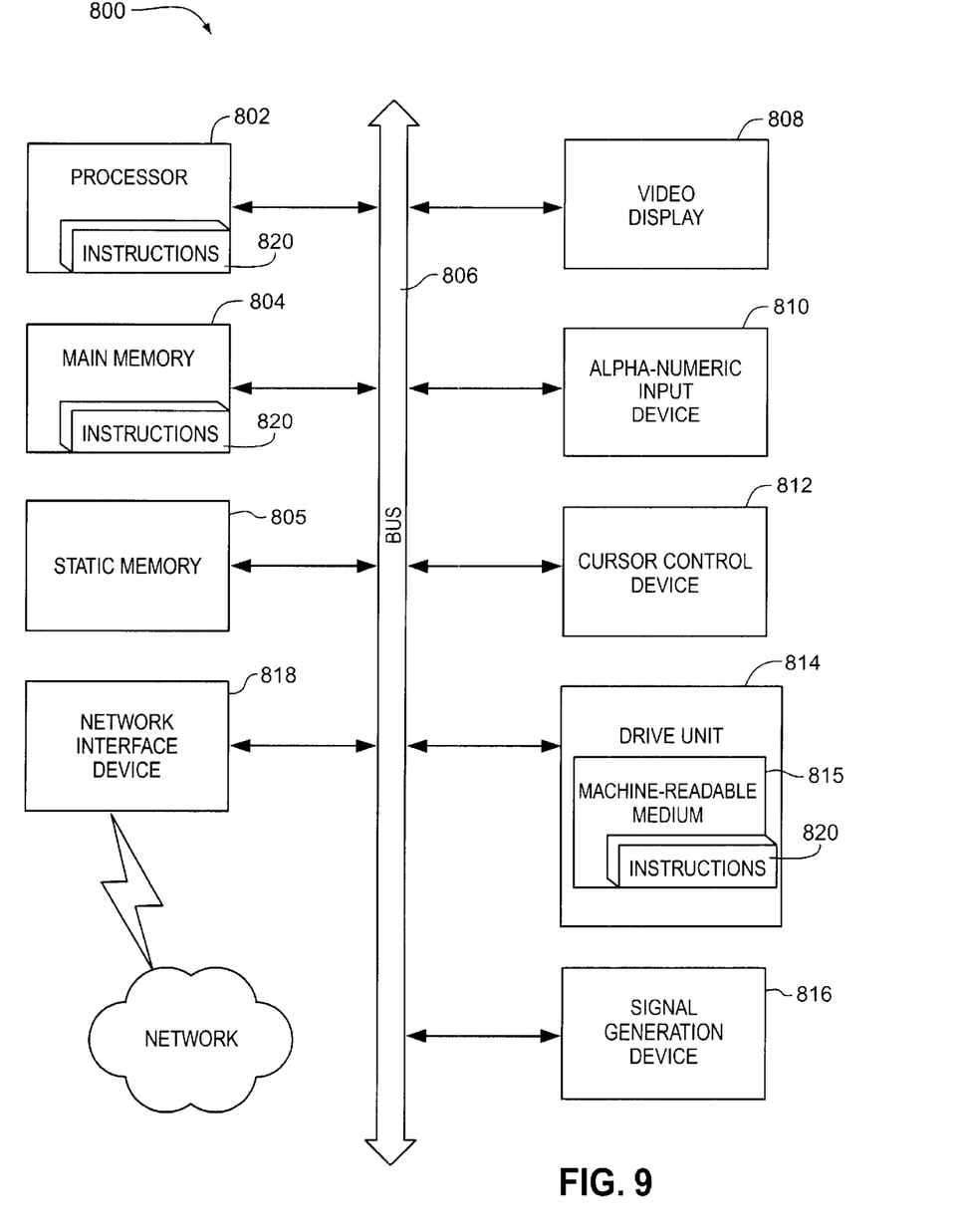
FIG. 9 is a block diagram illustrating an exemplary machine, the form of a computer system, within which a set of instructions for causing machine to perform any of the methodologies of the present invention may be executed.

FIG. 9 shows a diagrammatic representation of machine in the exemplary form of a computer system 800 within which a set of instructions, for causing the machine to perform any one of the methodologies discussed above, may be executed. The computer system 800 and includes a processor 0802, a main memory 804 and a static memory 805, which communicate with each other via a bus 806. The computer system 800 is further shown to include a video display unit 808 (e.g., a liquid crystal display (LCD) or a cathode ray tube (CRT)). The computer system 800 also includes an alphanumeric input device 810 (e.g. a keyboard), a cursor control device 812 (e.g. a mouse), a disk drive unit 814, a signal generation device 816 (e.g. a speaker) and a network interface device 818. The disk drive unit 814 includes a computer-readable medium 815 on which is stored a set of instructions (i.e., software) 820 embodying any one, or all, of the methodologies described above. The software 820 is also shown to reside, completely or at least partially, within the main memory 804 and/or within the processor 802. The software 820 may further be transmitted or received via the network interface device 818. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and apparatus for integrating business and transaction data in a transaction processing environment have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Referring again to FIG. 7, at 710, it is determined whether direct data link 116 is functional. If data link 116 is not functional, at 714, when data link 116 becomes available, the next record in sequence is requested from call distribution system 102 by information server 112. If data link is functional, the converted HDS and HDV messages are sent on data link 116 to the data warehouse of information server 112, as shown at 712. At 716, when the call terminates, the HDV information associated with the call as identified by the callID is stored only after 30 seconds have passed. It should be noted that records are written to the data buffer 700 regardless of whether the data link 116 is functional or not.

What is claimed is:

1. A telephone call processing system, comprising:
    an information server including a database for storing business data associated with call data for a particular call, wherein the business data may be transmitted for a predetermined time after termination of the call;

at least one call distribution device for receiving and distributing telephone calls coupled to the information server through a communication link of a second type; and at least one agent device coupled to at least one call distribution device through a communication link of a first type.

2. The telephone call processing system of claim 1, further comprising:

at least one workflow server coupled to the information server through a communication link of the second type;

at least one network router coupled to the information server through a communication link of the second type; and at least one information server administrator coupled to the information server through a communication link of a third type.

3. The telephone call processing system of claim 2, wherein the communication link of the first type is a computer telephony integration (CTI) link, the communication link of the second type is a transmission control protocol/internet protocol (TCP/IP) link, and the communication link of the third type is an application programming interface (API) link.

4. The telephone call processing system of claim 2, further comprising at least one reporting device, wherein the at least one reporting device communicates with the information server through open database connectivity (ODBC) queries.

5. A machine-readable medium storing a sequence of instructions that, when executed by a machine, cause the machine to perform the steps of:

receiving business data in a first format from an agent device in a call processing system;

translating the business data to a second format;

storing the business data in a persistent circular buffer;

associating the business data with a transaction identifier; and transmitting the business data and the transaction identifier to an information server for storage with call data that is associated with the transaction identifier.

6. The machine-readable medium of claim 5, wherein the sequence of instructions, when executed by the machine, further cause the machine to perform the steps of:

receiving a wait signal from the agent device:
in response to the wait signal, waiting a predetermined amount of time after a termination of call;
after the expiration of the predetermined time, associating the business data with the transaction identifier; and
transmitting the business data and the transaction identifier to the information server for storage.

7. The machine-readable medium of claim 6, wherein the business data is received in near-real-time, and wherein the first format is a computer telephony integration (CTI) format.

8. The machine-readable medium of claim 7, wherein the second format is a transmission control protocol/internet protocol (TCP/IP) format.

9. The machine-readable medium of claim 6, wherein the sequence of instructions, when executed by the machine, further cause the machine to perform the steps of:

associating the business data with a sequence number;

storing the business data with the sequence number in the persistent circular buffer;

when a fault occurs in a communications link linking the agent device and the information server fails, receiving a request from the information server upon restoration of the link, wherein the request specifies a last sequence number received by the information server before the occurrence of the fault.

10. The machine-readable medium of claim 9 wherein the sequence of instructions, when executed by the machine, further cause the machine to perform the step of, upon receipt of the request, transmitting business data associated with a sequence number following the sequence number last received by the information server.

11. A transaction processing method comprising:

receiving a host data signal message at a centralized data warehouse coupled to a transaction distribution system from an agent device associated with a transaction, the host data signal message including a transaction identifier linking the host data signal message with the transaction and requesting that the data warehouse wait a predetermined amount of time after termination of the transaction for one or more corresponding host data value messages before storing a transaction segment record for the transaction to enable transaction data associated with the transaction and business data conveyed by the one or more corresponding host data value messages to be stored together in the transaction segment record on the centralized data warehouse;

receiving the one or more corresponding host data value messages at the centralized data warehouse, the one or more corresponding host data value messages including the business data and the transaction identifier linking them to the transaction and to the host data signal message; and after receiving the one or more corresponding host data value messages, storing the transaction data and the business data together in a transaction segment record on the centralized data warehouse to enable easy association of the transaction data and the business data with the transaction and easy accessibility of the transaction data and the business data.

12. A method as in claim 11 wherein the transaction comprises a call.

13. A method as in claim 11 wherein the centralized data warehouse employs an open star schema data model.

14. A method as in claim 11 wherein the business data comprises at least one success entry, one failure entry, one revenue generated entry, one sale type entry, one sale amount entry, or one information request entry.

15. A method as in claim 11 wherein the transaction data comprises at least one queue time entry, duration of the call entry, time of call entry, origin of the call entry, or agent identification entry.

16. A method as in claim 11, further comprising:

transmitting the host data signal message in a first format from the agent device to a transaction processing system over a first link;

transmitting the host data value message in the first format from the agent device to the transaction processing system over the first link;

transmitting the host data signal message in a second format from the transaction processing system to the data warehouse over a second link; and transmitting the host data value message in the second format from the transaction processing system to the data warehouse over the second link.

17. A method as in claim 11, further comprising:

converting the host data signal message from the first format to the second format;

converting the host data value message from the first format to the second format;

storing the host data signal message in the second format in a first-in-first-out (FIFO) disk file on the transaction processing system; and storing the host data value message in the second format in the first-in-first-out (FIFO) disk file on the transaction processing system.

18. A method as in claim 17, further comprising:

when a transmission is sent to the data warehouse, transmitting a sequence number associated with the transmission; and if the second link fails, sending a request for a transmission from the data warehouse to the transaction processing system, wherein the request includes a sequence number of a last transmission received by the data warehouse before the second link failed.

19. The method of claim 16, wherein the first transmission link is a computer telephony integration (CTI) link.

20. The method of claim 16, wherein the second transmission link is a transmission control protocol/internet protocol (TCP/IP) link.

21. A transaction processing method comprising:

receiving a host data signal message at a centralized data warehouse coupled to a transaction distribution system from an agent device associated with an in-process transaction, the host data signal message including a transaction identifier linking the host data signal message with the in-process transaction and requesting that the data warehouse wait a predetermined amount of time after termination of the in-process transaction for one or more corresponding host data value messages before storing a transaction segment record for the in-process transaction to enable transaction data associated with the in-process transaction and business data conveyed by the one or more corresponding host data value messages to be stored together in the transaction segment record on the centralized data warehouse;

waiting the predetermined amount of time after termination of the in-process transaction before storing the transaction segment record;

if the one or more corresponding host data value messages are received at the centralized data warehouse prior to expiration of the predetermined amount of time, the one or more corresponding host data value messages including the business data and the transaction identifier linking them to the in-process transaction and to the host data signal message, then storing the transaction data and the business data together in the transaction segment record on the centralized data warehouse to enable easy association of the transaction data and the business data with the in-process transaction and easy accessibility of the transaction data and the business data; and otherwise, if the one or more corresponding host data value messages are not received at the centralized data warehouse prior to expiration of the predetermined amount of time, then storing the transaction data without the business data in the transaction segment record on the centralized data warehouse.

22. A method as in claim 21 wherein the transaction comprises a call.

23. A method as in claim 21 wherein the centralized data warehouse employs an open star schema data model.

24. A method as in claim 21 wherein the business data comprises at least one success entry, one failure entry, one revenue generated entry, one sale type entry, one sale amount entry, or one information request entry.

25. A method as in claim 21 wherein the transaction data comprises at least one queue time entry, duration of the call entry, time of call entry, origin of the call entry, or agent identification entry.

26. A method as in claim 21, further comprising:

transmitting the host data signal message in a first format from the agent device to a transaction processing system over a first link;

transmitting the host data value message in the first format from the agent device to the transaction processing system over the first link;

transmitting the host data signal message in a second format from the transaction processing system to the data warehouse over a second link; and transmitting the host data value message in the second format from the transaction processing system to the data warehouse over the second link.

27. A method as in claim 21, further comprising:

converting the host data signal message from the first format to the second format;

converting the host data value message from the first format to the second format;

storing the host data signal message in the second format in a first-in-first-out (FIFO) disk file on the transaction processing system; and storing the host data value message in the second format in the first-in-first-out (FIFO) disk file on the transaction processing system.

28. A method as in claim 27, further comprising:

when a transmission is sent to the data warehouse, transmitting a sequence number associated with the transmission; and if the second link fails, sending a request for a transmission from the data warehouse to the transaction processing system, wherein the request includes a sequence number of a last transmission received by the data warehouse before the second link failed.

29. The method of claim 24, wherein the first transmission link is a computer telephony integration (CTI) link.

30. The method of claim 24, wherein the second transmission link is a transmission control protocol/internet protocol (TCP/IP) link.

* * * * *

UNITED STATES PATENT AND TRADEMARK OFFICE
CERTIFICATE OF CORRECTION

PATENT NO.    : 6,442,269 B1  
DATED         : August 27, 2002  
INVENTOR(S)   : Ehrlich et al.

It is certified that error appears in the above-identified patent and that said Letters Patent is hereby corrected as shown below:

Column 1,  
Line 15, delete "Modem" and insert -- Modern --.

Column 10,  
Line 17, delete "0802" and insert -- 802 --.

Signed and Sealed this

Twenty-fifth Day of March, 2003

JAMES E. ROGAN  
*Director of the United States Patent and Trademark Office*